(12) United States Patent
Hadani et al.

(10) Patent No.: US 10,555,281 B2
(45) Date of Patent: Feb. 4, 2020

(54) WIRELESS TELECOMMUNICATIONS SYSTEM FOR HIGH-MOBILITY APPLICATIONS

(71) Applicant: Cohere Technologies, Inc., Santa Clara, CA (US)

(72) Inventors: Ron Hadani, Austin, TX (US); Shlomo Rakib, Saratoga, CA (US)

(73) Assignee: Cohere Technologies, Inc., Santa Clara, CA (US)

( * ) Notice: Subject to any disclaimer, the term of this patent is extended or adjusted under 35 U.S.C. 154(b) by 0 days.

(21) Appl. No.: 16/084,820

(22) PCT Filed: Mar. 31, 2017

(86) PCT No.: PCT/US2017/025291
§ 371 (c)(1),
(2) Date: Sep. 13, 2018

(87) PCT Pub. No.: WO2017/173219
PCT Pub. Date: Oct. 5, 2017

(65) Prior Publication Data
US 2019/0075551 A1  Mar. 7, 2019

Related U.S. Application Data

(63) Continuation of application No. 15/146,987, filed on May 5, 2016, now Pat. No. 9,667,307.
(Continued)

(51) Int. Cl.
*H04W 72/04* (2009.01)
*H04B 1/62* (2006.01)
(Continued)

(52) U.S. Cl.
CPC .......... *H04W 72/04* (2013.01); *H04B 1/0475* (2013.01); *H04B 1/62* (2013.01);
(Continued)

(58) Field of Classification Search
CPC ....... H04W 72/04; H04B 1/0475; H04B 1/62; H04J 11/003; H04L 1/0018; H04L 5/0014;
(Continued)

(56) References Cited

U.S. PATENT DOCUMENTS 4,754,493 A  6/1988 Coates
5,083,135 A  1/1992 Nagy et al.
(Continued)

FOREIGN PATENT DOCUMENTS

CN  1235720 A  11/1999
CN  101682316 A  3/2010
(Continued)

OTHER PUBLICATIONS

Office Action for U.S. Appl. No. 13/117,119, dated Aug. 5, 2013, 5 pages.
(Continued)

*Primary Examiner* — Freshteh N Aghdam
(74) *Attorney, Agent, or Firm* — Perkins Coie LLP

(57) ABSTRACT

A wireless telecommunications system that mitigates infra-symbol interference due to Doppler-shift and multipath. Embodiments of the present invention are particularly advantageous for wireless telecommunications systems that operate in high-mobility environments, including high-speed trains and airplanes.

20 Claims, 13 Drawing Sheets

Related U.S. Application Data

(60) Provisional application No. 62/316,298, filed on Mar. 31, 2016, provisional application No. 62/316,243, filed on Mar. 31, 2016.

(51) Int. Cl.

| | |
|---|---|
| *H04B 1/04* | (2006.01) |
| *H04L 23/02* | (2006.01) |
| *H04L 25/03* | (2006.01) |
| *H04L 27/26* | (2006.01) |
| *H04L 5/00* | (2006.01) |
| *H04J 11/00* | (2006.01) |
| *H04L 27/04* | (2006.01) |
| *H04L 1/00* | (2006.01) |
| *H04B 15/00* | (2006.01) |
| *H04L 27/06* | (2006.01) |

(52) U.S. Cl.
CPC .......... *H04J 11/003* (2013.01); *H04L 1/0018* (2013.01); *H04L 5/0014* (2013.01); *H04L 5/0016* (2013.01); *H04L 5/0023* (2013.01); *H04L 5/0044* (2013.01); *H04L 23/02* (2013.01); *H04L 25/03006* (2013.01); *H04L 25/03834* (2013.01); *H04L 27/04* (2013.01); *H04L 27/265* (2013.01); *H04L 27/2626* (2013.01); *H04L 27/2634* (2013.01); *H04L 27/2655* (2013.01); *H04L 27/2697* (2013.01); *H04B 15/00* (2013.01); *H04L 27/06* (2013.01)

(58) Field of Classification Search
CPC ... H04L 5/0016; H04L 5/0023; H04L 5/0044; H04L 23/02; H04L 25/03006; H04L 25/03834; H04L 27/04; H04L 27/2626
See application file for complete search history.

(56) References Cited

U.S. PATENT DOCUMENTS

| | | | |
|---|---|---|---|
| 5,182,642 A | 1/1993 | Gersdorff et al. | |
| 5,623,511 A | 4/1997 | Bar-David et al. | |
| 5,831,977 A | 11/1998 | Dent | |
| 5,835,529 A | 11/1998 | Koga et al. | |
| 5,872,542 A | 2/1999 | Simons et al. | |
| 5,956,624 A | 9/1999 | Hunsinger et al. | |
| 6,055,415 A | 4/2000 | Suzuki | |
| 6,212,246 B1 | 4/2001 | Hendrickson | |
| 6,289,063 B1 | 9/2001 | Duxbury | |
| 6,356,555 B1 | 3/2002 | Rakib et al. | |
| 6,381,234 B2 | 4/2002 | Sakoda et al. | |
| 6,388,621 B1 | 5/2002 | Lynch | |
| 6,426,983 B1 | 7/2002 | Rakib et al. | |
| 6,608,864 B1 | 8/2003 | Strait | |
| 6,631,168 B2 | 10/2003 | Izumi | |
| 6,704,366 B1 | 3/2004 | Combes et al. | |
| 6,956,814 B1 | 10/2005 | Campanella | |
| 7,010,048 B1 | 3/2006 | Shattil | |
| 7,327,812 B2 | 2/2008 | Auer | |
| 7,392,018 B1 | 6/2008 | Ebert et al. | |
| 7,689,049 B2 | 3/2010 | Monro | |
| 7,773,685 B2* | 8/2010 | Tirkkonen | H04L 1/0009 375/267 |
| 7,864,877 B2* | 1/2011 | Hottinen | H04B 7/0691 370/328 |
| 8,229,017 B1 | 7/2012 | Lee et al. | |
| 8,259,845 B2 | 9/2012 | Dent | |
| 8,401,131 B2 | 3/2013 | Fety et al. | |
| 8,547,988 B2 | 10/2013 | Hadani et al. | |
| 8,619,892 B2* | 12/2013 | Vetter | H04B 7/0452 375/267 |
| 8,717,210 B2 | 5/2014 | Eldar et al. | |
| 8,879,378 B2 | 11/2014 | Rakib et al. | |
| 8,892,048 B1 | 11/2014 | Turner | |
| 8,976,851 B2 | 3/2015 | Hadani et al. | |
| 9,031,141 B2 | 5/2015 | Hadani et al. | |
| 9,071,285 B2 | 6/2015 | Hadani et al. | |
| 9,071,286 B2 | 6/2015 | Hadani et al. | |
| 9,083,483 B1 | 7/2015 | Rakib et al. | |
| 9,083,595 B2 | 7/2015 | Rakib et al. | |
| 9,130,638 B2 | 9/2015 | Hadani et al. | |
| 9,282,528 B2 | 3/2016 | Hashimoto | |
| 9,294,315 B2 | 3/2016 | Hadani et al. | |
| 9,444,514 B2 | 9/2016 | Hadani et al. | |
| 9,479,381 B2 | 10/2016 | Siohan et al. | |
| 9,548,840 B2 | 1/2017 | Hadani et al. | |
| 9,553,984 B2 | 1/2017 | Krause et al. | |
| 9,590,779 B2 | 3/2017 | Hadani et al. | |
| 9,634,719 B2 | 4/2017 | Rakib et al. | |
| 9,660,851 B2 | 5/2017 | Hadani et al. | |
| 9,668,148 B2 | 5/2017 | Hadani et al. | |
| 9,712,354 B2 | 7/2017 | Hadani et al. | |
| 9,729,281 B2 | 8/2017 | Hadani et al. | |
| 2001/0031022 A1 | 10/2001 | Petrus et al. | |
| 2001/0033614 A1 | 10/2001 | Hudson | |
| 2001/0046205 A1 | 11/2001 | Easton et al. | |
| 2002/0001308 A1 | 1/2002 | Heuer | |
| 2002/0034191 A1 | 3/2002 | Shattil | |
| 2002/0181388 A1 | 12/2002 | Jain et al. | |
| 2002/0181390 A1 | 12/2002 | Mody et al. | |
| 2002/0181607 A1 | 12/2002 | Izumi | |
| 2003/0073464 A1 | 4/2003 | Giannakis et al. | |
| 2003/0185295 A1 | 10/2003 | Yousef | |
| 2003/0235147 A1 | 12/2003 | Walton et al. | |
| 2004/0044715 A1 | 3/2004 | Aldroubi et al. | |
| 2004/0174812 A1 | 9/2004 | Murakami et al. | |
| 2004/0189581 A1 | 9/2004 | Sako et al. | |
| 2004/0218523 A1 | 11/2004 | Varshney et al. | |
| 2005/0157778 A1 | 7/2005 | Trachewsket et al. | |
| 2005/0157820 A1 | 7/2005 | Wongwirawat et al. | |
| 2005/0180517 A1 | 8/2005 | Abe | |
| 2005/0207334 A1 | 9/2005 | Hadad | |
| 2005/0251844 A1 | 11/2005 | Martone et al. | |
| 2006/0008021 A1* | 1/2006 | Bonnet | H04L 1/0618 375/267 |
| 2006/0039270 A1 | 2/2006 | Strohmer et al. | |
| 2007/0014272 A1 | 1/2007 | Palanki et al. | |
| 2007/0038691 A1 | 2/2007 | Candes et al. | |
| 2007/0078661 A1 | 4/2007 | Sriram et al. | |
| 2007/0104283 A1* | 5/2007 | Han | H04B 7/0408 375/260 |
| 2007/0110131 A1 | 5/2007 | Guess et al. | |
| 2007/0211952 A1 | 9/2007 | Faber et al. | |
| 2007/0237181 A1 | 10/2007 | Cho et al. | |
| 2007/0253465 A1 | 11/2007 | Muharemovic et al. | |
| 2007/0253504 A1 | 11/2007 | Hasegawa | |
| 2008/0043857 A1 | 2/2008 | Dias et al. | |
| 2008/0117999 A1 | 5/2008 | Kadous et al. | |
| 2008/0186843 A1 | 8/2008 | Ma et al. | |
| 2008/0187062 A1 | 8/2008 | Pan et al. | |
| 2008/0232504 A1 | 9/2008 | Ma et al. | |
| 2008/0310383 A1 | 12/2008 | Kowalski | |
| 2009/0080403 A1 | 3/2009 | Hamdi | |
| 2009/0092259 A1 | 4/2009 | Jot et al. | |
| 2009/0103593 A1 | 4/2009 | Bergamo | |
| 2009/0122854 A1 | 5/2009 | Zhu et al. | |
| 2009/0161804 A1 | 6/2009 | Chrabieh et al. | |
| 2009/0204627 A1 | 8/2009 | Hadani | |
| 2009/0222226 A1 | 9/2009 | Baraniuk et al. | |
| 2009/0303961 A1 | 12/2009 | Popovic et al. | |
| 2010/0001901 A1 | 1/2010 | Baraniuk et al. | |
| 2010/0008432 A1 | 1/2010 | Kim et al. | |
| 2010/0027608 A1 | 2/2010 | Priotti | |
| 2010/0111138 A1 | 5/2010 | Hosur et al. | |
| 2010/0142476 A1 | 6/2010 | Jiang et al. | |
| 2010/0187914 A1 | 7/2010 | Rada et al. | |
| 2010/0238787 A1 | 9/2010 | Guey | |
| 2010/0277308 A1 | 11/2010 | Potkonjak | |
| 2010/0303136 A1 | 12/2010 | Ashikhmin et al. | |
| 2010/0322349 A1 | 12/2010 | Lee et al. | |
| 2011/0007789 A1 | 1/2011 | Garmany | |
| 2011/0110532 A1 | 5/2011 | Svendsen | |
| 2011/0116489 A1 | 5/2011 | Grandhi | |

(56) References Cited

U.S. PATENT DOCUMENTS

| | | |
|---|---|---|
| 2011/0116516 A1 | 5/2011 | Hwang et al. |
| 2011/0126071 A1 | 5/2011 | Han et al. |
| 2011/0131463 A1 | 6/2011 | Gunnam |
| 2011/0216808 A1 | 9/2011 | Tong et al. |
| 2011/0286502 A1 | 11/2011 | Adachi et al. |
| 2011/0287778 A1 | 11/2011 | Levin et al. |
| 2011/0292971 A1 | 12/2011 | Hadani et al. |
| 2011/0293030 A1 | 12/2011 | Rakib et al. |
| 2011/0299379 A1 | 12/2011 | Sesia et al. |
| 2011/0305267 A1 | 12/2011 | Rius et al. |
| 2012/0021769 A1 | 1/2012 | Lindoff et al. |
| 2012/0051457 A1 | 3/2012 | Ma et al. |
| 2012/0140716 A1 | 6/2012 | Baldemair et al. |
| 2012/0170684 A1 | 7/2012 | Yim et al. |
| 2012/0201322 A1 | 8/2012 | Rakib et al. |
| 2012/0213098 A1 | 8/2012 | Sun |
| 2012/0235795 A1 | 9/2012 | Liao et al. |
| 2012/0269201 A1 | 10/2012 | Atungsiri et al. |
| 2012/0272117 A1 | 10/2012 | Stadelmeier et al. |
| 2012/0320994 A1 | 12/2012 | Loghin et al. |
| 2013/0021977 A1 | 1/2013 | Yang et al. |
| 2013/0058390 A1* | 3/2013 | Haas .................. H04W 52/42 375/224 |
| 2013/0077579 A1 | 3/2013 | Cho et al. |
| 2013/0083661 A1 | 4/2013 | Gupta et al. |
| 2013/0121497 A1 | 5/2013 | Smaragdis et al. |
| 2013/0230010 A1 | 9/2013 | Kim et al. |
| 2013/0260787 A1 | 10/2013 | Hashimoto |
| 2013/0279627 A1 | 10/2013 | Wu et al. |
| 2013/0315133 A1 | 11/2013 | Wang et al. |
| 2014/0143639 A1 | 5/2014 | Loghin et al. |
| 2014/0161154 A1 | 6/2014 | Hadani et al. |
| 2014/0169385 A1 | 6/2014 | Hadani et al. |
| 2014/0169406 A1 | 6/2014 | Hadani et al. |
| 2014/0169433 A1 | 6/2014 | Hadani et al. |
| 2014/0169436 A1 | 6/2014 | Hadani et al. |
| 2014/0169437 A1 | 6/2014 | Hadani et al. |
| 2014/0169441 A1 | 6/2014 | Hadani et al. |
| 2014/0247803 A1 | 9/2014 | Arambepola et al. |
| 2014/0348252 A1* | 11/2014 | Siohan .................. H04L 1/0668 375/261 |
| 2014/0364128 A1 | 12/2014 | Lee et al. |
| 2015/0080725 A1 | 3/2015 | Wegner |
| 2015/0117395 A1 | 4/2015 | Hadani et al. |
| 2015/0326273 A1 | 11/2015 | Rakib et al. |
| 2015/0327085 A1 | 11/2015 | Hadani et al. |
| 2015/0382231 A1 | 12/2015 | Jabbar et al. |
| 2016/0043835 A1 | 2/2016 | Hadani et al. |
| 2016/0135132 A1 | 5/2016 | Donepudi et al. |
| 2016/0157146 A1 | 6/2016 | Karabinis |
| 2016/0182269 A1 | 6/2016 | Hadani et al. |
| 2016/0191217 A1 | 6/2016 | Hadani et al. |
| 2016/0191280 A1 | 6/2016 | Hadani et al. |
| 2016/0254889 A1 | 9/2016 | Shattil |
| 2016/0277225 A1 | 9/2016 | Frenne et al. |
| 2016/0309345 A1 | 10/2016 | Tehrani et al. |
| 2016/0380743 A1 | 12/2016 | Rakib |
| 2016/0381576 A1 | 12/2016 | Hadani et al. |
| 2017/0012749 A1 | 1/2017 | Rakib et al. |
| 2017/0012810 A1 | 1/2017 | Rakib et al. |
| 2017/0019297 A1 | 1/2017 | Rakib |
| 2017/0033899 A1 | 2/2017 | Rakib et al. |
| 2017/0040711 A1 | 2/2017 | Rakib et al. |
| 2017/0078054 A1 | 3/2017 | Hadani et al. |
| 2017/0099122 A1 | 4/2017 | Hadani et al. |
| 2017/0099607 A1 | 4/2017 | Hadani et al. |
| 2017/0149594 A1 | 5/2017 | Rakib |
| 2017/0149595 A1 | 5/2017 | Rakib et al. |
| 2017/0201354 A1 | 7/2017 | Hadani et al. |
| 2017/0207817 A1 | 7/2017 | Hadani et al. |
| 2017/0222700 A1 | 8/2017 | Hadani et al. |
| 2017/0230215 A1 | 8/2017 | Rakib et al. |
| 2017/0244524 A1 | 8/2017 | Hadani et al. |

FOREIGN PATENT DOCUMENTS

| | | |
|---|---|---|
| CN | 101939935 A | 1/2011 |
| EP | 1432168 A1 | 6/2004 |
| JP | 2011127910 | 6/2011 |
| WO | 2007004297 | 1/2007 |
| WO | 2011137699 A1 | 11/2011 |
| WO | 2011150315 | 12/2011 |
| WO | 2013148546 | 10/2013 |
| WO | 2014004585 | 1/2014 |
| WO | 2016014596 | 1/2016 |
| WO | 2016014598 | 1/2016 |
| WO | 2016176642 | 11/2016 |
| WO | 2016183230 | 11/2016 |
| WO | 2016183240 | 11/2016 |
| WO | 2016209848 | 12/2016 |
| WO | 2017003952 | 1/2017 |
| WO | 2017011478 | 1/2017 |

OTHER PUBLICATIONS

Notice of Allowance for U.S. Appl. No. 13/117,119, dated Feb. 28, 2014, 13 pages.
Banelli, P. et al., "Modulation Formats and Waveforms for 5G Networks: Who Will Be the Heir of OFDM?," IEEE Signal Processing Magazine, vol. 81, pp. 80-93, Nov. 2014.
El Hattachi, R. et al., "NGMN 5G Initiative White Paper," NGMN Alliance, Feb. 17, 2015. [Online]. Available: https://www.ngmn.org/uploads/media/NGMN_5G_White_Paper_V1_0.pdf, 125 pages.
Rusek, F. et al., "Scaling Up MIMO, Opportunities and Challenges with Very Large Arrays," IEEE Signal Processing Magazine, pp. 40-60 (2013).
Vodafone, "Cellular Internet of Things: Architectural Aspects," RP-150869, 3GPP Ran#68, Malmo, Sweden (Jun. 9, 2015), 19 pages.
Supplementary European Search Report for European Application No. 11787483.4, dated Sep. 9, 2014, 6 pages.
International Search Report and Written Opinion for International Application No. PCT/US2011/038302, dated Nov. 15, 2011, 8 pages.
International Preliminary Report on Patentability for International Application No. PCT/US2011/038302, dated Dec. 4, 2012, 7 pages.
Office Action for U.S. Appl. No. 13/117,124, dated Feb. 22, 2013, 7 pages.
Notice of Allowance for U.S. Appl. No. 13/117,124, dated Aug. 8, 2013, 10 pages.
Office Action for U.S. Appl. No. 14/605,957, dated Jun. 22, 2017, 6 pages.
Supplementary European Search Report for European Application No. 13809004.8, dated Apr. 14, 2016, 8 pages.
Communication Pursuant to Article 94(3) EPC for European Application No. 13809004.8, dated Feb. 17, 2017, 5 pages.
15 Notice of Allowance for U.S. Appl. No. 13/927,087, dated Feb. 25, 2015, 9 pages.
Office Action for U.S. Appl. No. 13/927,087, dated Nov. 12, 2014, 14 pages.
Gurevich, S. et al. "Group Representation Design of Digital Signals and Sequences," S.W. Golomb et al. (eds.), SETA 2008, LNCS 5203, pp. 153-166, Springer-Verlag Berlin Heidelberg (2008).
International Search Report and Written Opinion for International Application No. PCT/US2013/047723, dated Oct. 29, 2013, 17 pages.
International Preliminary Report on Patentability for International Application No. PCT/US2013/047723, dated Dec. 31, 2014, 15 pages.
Notice of Allowance for U.S. Appl. No. 13/927,088, dated Feb. 18, 2015, 7 pages.
Office Action for U.S. Appl. No. 13/927,088, dated Nov. 28, 2014, 13 pages.
Notice of Allowance for U.S. Appl. No. 13/927,086, dated Dec. 26, 2014, 8 pages.
Supplemental Notice of Allowability for U.S. Appl. No. 13/927,086, dated Mar. 19, 2015, 4 pages.

(56) References Cited

OTHER PUBLICATIONS

Office Action for U.S. Appl. No. 13/927,086, dated Oct. 14, 2014, 10 pages.
Office Action for U.S. Appl. No. 13/927,089, dated Dec. 24, 2014, 13 pages.
Office Action for U.S. Appl. No. 13/927,089, dated Aug. 14, 2015, 7 pages.
Supplemental Notice of Allowability for U.S. Appl. No. 13/927,091, dated Jun. 11, 2015, 4 pages.
Notice of Allowance for U.S. Appl. No. 13/927,091, dated Apr. 24, 2015, 8 pages.
Office Action for U.S. Appl. No. 13/927,091, dated Jan. 27, 2015, 15 pages.
Office Action for U.S. Appl. No. 13/927,092, dated Oct. 8, 2014, 5 pages.
Notice of Allowance for U.S. Appl. No. 13/927,092, dated Oct. 24, 2014, 7 pages.
Office Action for U.S. Appl. No. 13/927,095, dated Apr. 30, 2015, 11 pages.
Office Action for U.S. Appl. No. 13/927,095, dated Nov. 4, 2015, 9 pages.
Office Action for U.S. Appl. No. 13/927,095, dated Jun. 1, 2016, 10 pages.
Office Action for U.S. Appl. No. 14/717,886, dated Apr. 19, 2016, 10 pages.
Office Action for U.S. Appl. No. 14/709,377, dated Dec. 11, 2015, 12 pages.
Office Action for U.S. Appl. No. 14/709,377, dated Jul. 13, 2016, 17 pages.
Examination Report No. 1 for Australian Application No. 2013239970, dated Dec. 8, 2015, 3 pages.
"AT&T Annual Report 2014," Opening Our Network [Online]. Retrieved from the Internet: Sep. 22, 2016. <URL: http://www.att.com/Investor/ATT_Annual/2014/att_introduces_new_concepts_for_telecom_network.html>, 5 pages.
Catt, "UL ACK/NACK transmission methods for LTE-A," 3GPP TSG RAN WG1 Meeting #60bis, R1-102453, Beijing, China, Apr. 12-16, 2010, 8 pages.
Toskala, A. et al., "Physical Layer," Chapter 5 In: "LTE for UMTS: OFDMA and SC-FDMA Based Radio Access," Holma, H. et al. (eds.), John Wiley & Sons, Ltd., United Kingdom, 2009, pp. 83-135.
Mecklenbrauker, W., "A Tutorial on Non-Parametric Bilinear Time-Frequency Signal Representations," In: Time and Frequency Representation of Signals and Systems, Longo, G. et al. (eds.), Springer-Verlag Wien, vol. 309, pp. 11-68 (1989).
Nehorai, A. et al., "MURI: Adaptive waveform design for full spectral dominance (2005-2010)," AFOSR FA9550-05-1-0443, Final Report, [online], Mar. 11, 2011 Retrieved on May 11, 2013, Retrieved from the Internet <URL: http://oai.dtic.mil/oai/oai?verb=getRecord&metadataPrefix=html&identifier=ADA565420>, 103 pages.
Office Action for Japanese Application No. 2015-518647, dated Jul. 7, 2015, 10 pages.
Office Action for U.S. Appl. No. 14/754,596, dated Apr. 19, 2016, 18 pages.
Office Action for U.S. Appl. No. 14/809,129, dated Jul. 19, 2016, 5 pages.
Office Action for U.S. Appl. No. 15/617,962, dated Sep. 6, 2017, 10 pages.
International Search Report and Written Opinion for International Application No. PCT/US2016/050825, dated Feb. 8, 2017, 12 pages.
International Search Report and Written Opinion for International Application No. PCT/US2016/052524, dated Dec. 20, 2016, 8 pages.
Office Action for U.S. Appl. No. 15/374,995, dated Aug. 7, 2017, 6 pages.
International Search Report and Written Opinion for International Application No. PCT/US2017/025797, dated Jun. 21, 2017, 6 pages.
International Search Report and Written Opinion for International Application No. PCT/US2016/030259, dated Aug. 1, 2016, 13 pages.
Office Action for U.S. Appl. No. 15/152,464, dated Apr. 6, 2017, 10 pages.
Examination Report No. 1 for Australian Application No. 2013280487, dated May 2, 2016, 3 pages.
International Search Report and Written Opinion for International Application No. PCT/US2016/031928, dated Oct. 7, 2016, 10 pages.
Office Action for U.S. Appl. No. 15/188,946, dated May 8, 2017, 14 pages.
International Search Report and Written Opinion for International Application No. PCT/US2016/038584, dated Sep. 26, 2016, 8 pages.
Office Action for U.S. Appl. No. 15/187,668, dated Feb. 16, 2017, 6 pages.
International Search Report and Written Opinion for International Application No. PCT/US2016/031909, dated Aug. 11, 2016, 13 pages.
Office Action for U.S. Appl. No. 15/194,494, dated May 5, 2017, 16 pages.
International Search Report and Written Opinion for International Application No. PCT/US2016/039662, dated Nov. 29, 2016, 14 pages.
Office Action for U.S. Appl. No. 15/436,653, dated Jun. 2, 2017, 10 pages.
Office Action for U.S. Appl. No. 15/208,545, dated Aug. 21, 2017, 15 pages.
International Search Report and Written Opinion for International Application No. PCT/US2016/041940, dated Oct. 20, 2016, 8 pages.
Supplementary European Search Report for European Application No. 13768150.8, dated Oct. 30, 2015, 7 pages.
International Search Report and Written Opinion for International Application No. PCT/US2013/033652, dated Jun. 12, 2013, 8 pages.
International Search Report and Written Opinion for International Application No. PCT/US2015/041417, dated Oct. 1, 2015, 7 pages.
Office Action for U.S. Appl. No. 14/805,407, dated Dec. 14, 2016, 7 pages.
International Search Report and Written Opinion for International Application No. PCT/US2015/041420, dated Oct. 1, 2015, 6 pages.
Hadani et al., "Orthogonal Time Frequency Space Modulation", 2017, IEEE Wireless Communications and Networking Conference (MCNC), San Francisco, CA, USA, 2017, pp. 1-6.
Mazzaro et al., "Introduction to Stepped-Frequency Radar", US Army RDECOM, Aug. 2013, pp. 1-22.

\* cited by examiner

US 10,555,281 B2

WIRELESS TELECOMMUNICATIONS SYSTEM FOR HIGH-MOBILITY APPLICATIONS

STATEMENT OF RELATED APPLICATIONS

This application is a 371 National Phase Application of PCT Application No. PCT/US2017/025291, filed on 31 Mar. 2017, entitled "Wireless Telecommunications System for High-Mobility Applications", which claims the benefit of U.S. Provisional Application No. 62/316,243, filed on 31 Mar. 2016, entitled "Robust Wireless Telecommunications System," and U.S. Provisional Application No. 62/316,298, filed on 31 Mar. 2016, entitled "Orthogonal Time Frequency Space". In addition, PCT Application No. PCT/US2017/025291 is a continuation application of U.S. patent application Ser. No. 15/146,987, filed on 5 May 2016, entitled "Wireless Telecommunications System for High-Mobility Applications". The entire content of the aforementioned patent application is incorporated by the reference herein.

FIELD OF THE INVENTION

The present invention relates to wireless telecommunications in general, and, more particularly, to a wireless telecommunications system that can detect and mitigate impairments to its radio signals.

BACKGROUND OF THE INVENTION

A radio signal can be impaired as it propagates from a transmitter to a receiver, and the value of a wireless telecommunications system is substantially dependent on how well the system mitigates the effects of those impairments. In some cases, the transmitter can take steps to address the impairments, and in some cases the receiver addresses the impairments. In all cases, however, the nature of each impairment must be detected quickly and accurately so that it can be mitigated.

SUMMARY OF THE INVENTION

The present invention is a wireless telecommunications system that avoids some of the costs and disadvantages of wireless telecommunications systems in the prior art. In particular, the illustrative embodiment of the present invention is able to discriminate between direct-path and multi-path images, which (substantially) prevents infrasymbol interference and enables the remediation of intersymbol interference. Embodiments of the present invention are particularly advantageous in radio channels with multi-path and Doppler-shift impairments.

DETAILED DESCRIPTION

Figure 1A:
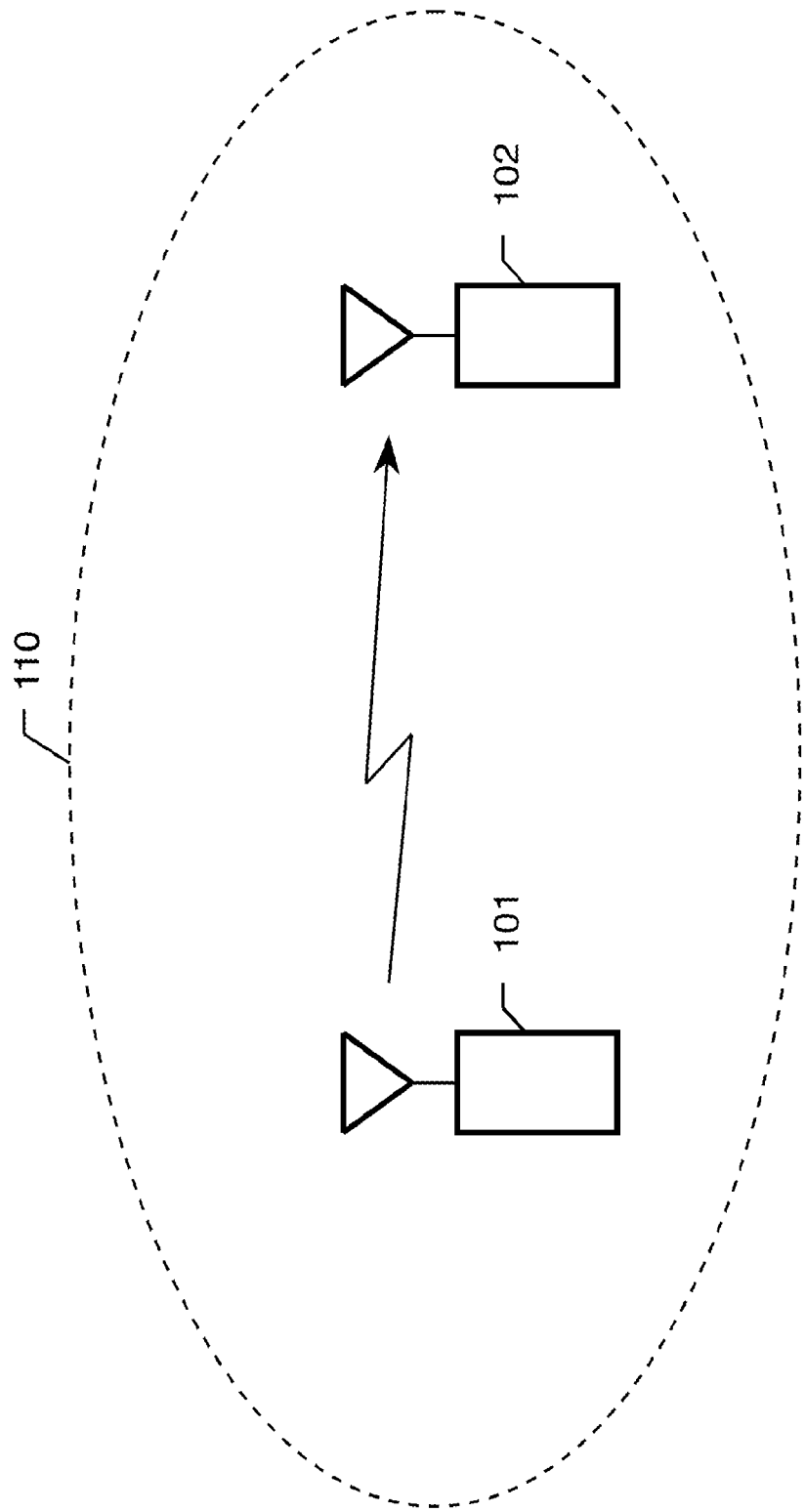
FIG. 1A depicts a block diagram of the salient components of wireless telecommunications system 100 in accordance with the illustrative embodiment of the present invention.

FIG. 1A depicts a block diagram of the salient components of wireless telecommunications system 100 in accordance with the illustrative embodiment of the present invention. Wireless telecommunications system 100 comprises radios 101 and 102, which are both situated in geographic region 110.

In accordance with the illustrative embodiment, radio 101 transmits a modulated radio-frequency carrier signal to radio 102. It will be clear to those skilled in the art, however, after reading this disclosure, how to make and use embodiments of the present invention in which radio 101 transmits a modulated radio-frequency carrier signal to radio 102 and radio 102 transmits a modulated radio-frequency carrier signal to radio 101.

In accordance with the illustrative embodiment, radio 101 transmits a plurality of data items to radio 102, which data items represent sound, images, video, data, and signaling. It will be clear to those skilled in the art how to make radio 101 so that it can de-construct sound, images, video, data, and signaling into data items, and it will be clear to those skilled in the art how to make radio 102 so that it can re-construct sound, images, video, data, and signaling from those data items.

In accordance with the illustrative embodiment, each data item is represented by a complex number that corresponds to one symbol in a 16 quadrature-amplitude ("16 QAM") signal constellation modulation scheme. It will be clear to those skilled in the art, however, after reading this disclosure, how to make and use alternative embodiments of the present invention in which each data item corresponds to a symbol in any digital modulation scheme (e.g., frequency-shift keying, amplitude-shift keying, phase-shift keying, etc.).

In accordance with the illustrative embodiment, wireless telecommunications system 100 comprises two radios, but it will be clear to those skilled in the art, after reading this disclosure, how to make and use alternative embodiments of the present invention that comprise any number of radios.

In accordance with the illustrative embodiment, wireless telecommunications system 100 operates in point-to-point (i.e., 1:1) mode. It will be clear to those skilled in the art, however, after reading this disclosure, how to make and use embodiments of the present invention that operate in broadcast (i.e., 1:>1) mode.

In accordance with the illustrative embodiment, radios 101 and 102 are mobile, but it will be clear to those skilled in the art, after reading this disclosure, how to make and use alternative embodiments of the present invention in which each radio is either mobile or stationary.

In accordance with the illustrative embodiment, geographic region 110 comprises natural and man-made radio-frequency objects (not shown) that reflect, refract, and diffract the carrier signals that propagate from radio 101 to radio 102. Furthermore, some of the radio-frequency objects are stationary (e.g., trees, hills, buildings, etc.) and some are mobile (e.g., trucks, ships, airplanes, etc.).

In accordance with the illustrative embodiment, the parameters that characterize the signal-path impairments in the radio channel between radios 101 and 102 are dynamic (i.e., change with respect to time). It will be clear to those skilled in the art, after reading this disclosure, how to make and use embodiments of the present invention in which the characteristics of the radio channel and the nature of the signal-path impairments are static (i.e., do not change with respect to time).

In accordance with the illustrative embodiment, radio 101 transmits the modulated radio-frequency carrier signal to radio 102 in a channel that is B=10 MHz wide. It will be clear to those skilled in the art, however, after reading this disclosure, how to make and use alternative embodiments of the present invention in which the radio channel has different bandwidth (e.g., 2.5 MHz, 5.0 MHz, 12.5 MHz, 15 MHz, 20 MHz, 40 MHz, 80 MHz, etc.).

Figure 1B:
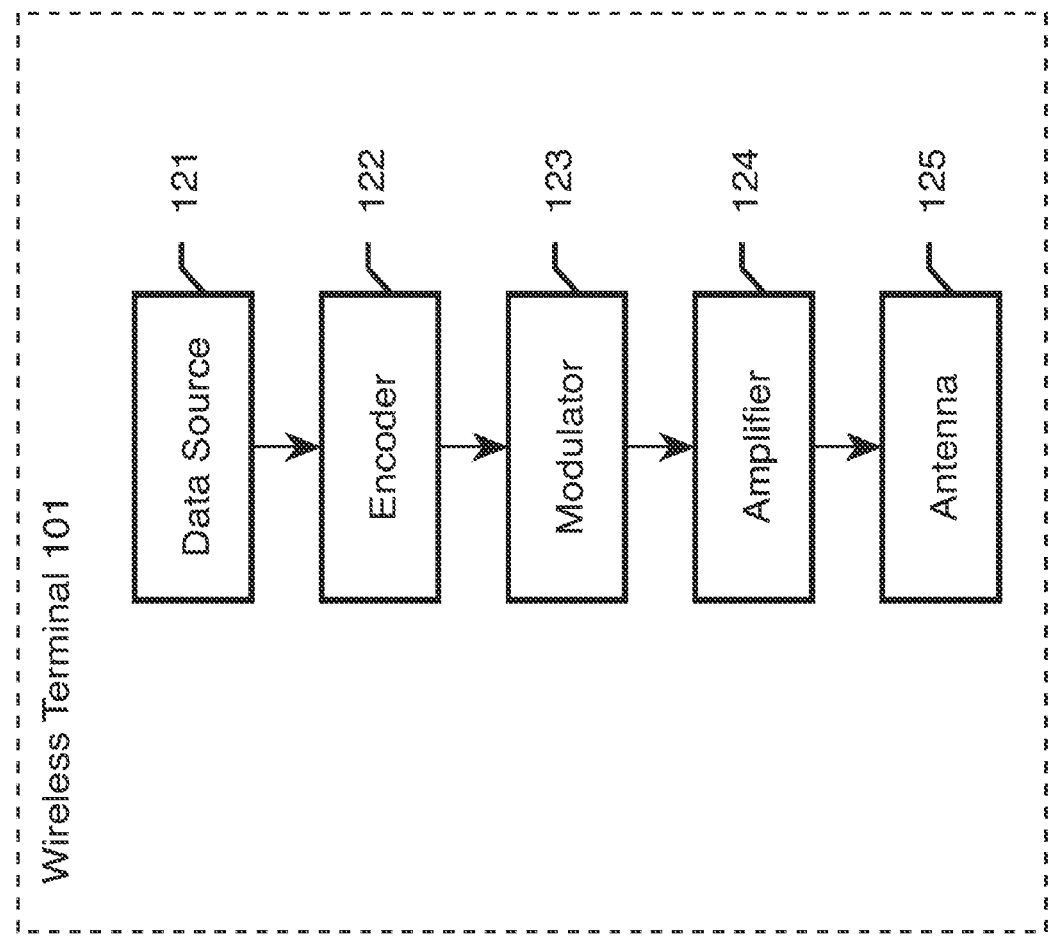
FIG. 1B depicts a block diagram of the salient components of radio 101 in accordance with the illustrative embodiment of the present invention.

FIG. 1B depicts a block diagram of the salient components of radio 101 in accordance with the illustrative embodiment of the present invention. Radio 101 comprises: data source 121, encoder 122, modulator 123, amplifier 124, and antenna 125.

Data source 121 comprises the hardware and software necessary to convert external stimuli (e.g., sound, light, a user's keystrokes, etc.) and internal stimuli (e.g., radio-frequency measurements, signaling, etc.) into data items to be transmitted to radio 102. It will be clear to those skilled in the art how to make and use data source 121.

Encoder 122 comprises the hardware and software necessary to compress, encrypt, and add forward error correction to the data items generated by data source 121. It will be clear to those skilled in the art how to make and use encoder 122.

Modulator 123 comprises the hardware and software necessary to modulate a radio-frequency carrier signal with the data items from encoder 122 to generate a modulated radio-frequency carrier signal. The construction and operation of modulator 123 is described in detail herein and in the accompanying figures.

Amplifier 124 comprises the hardware necessary to increase the power of the modulated radio-frequency carrier signal for transmission via antenna 125. It will be clear to those skilled in the art how to make and use amplifier 124.

Antenna 125 comprises the hardware necessary to facilitate the radiation of the modulated radio-frequency carrier signal wirelessly through space to radio 102.

Figure 2:
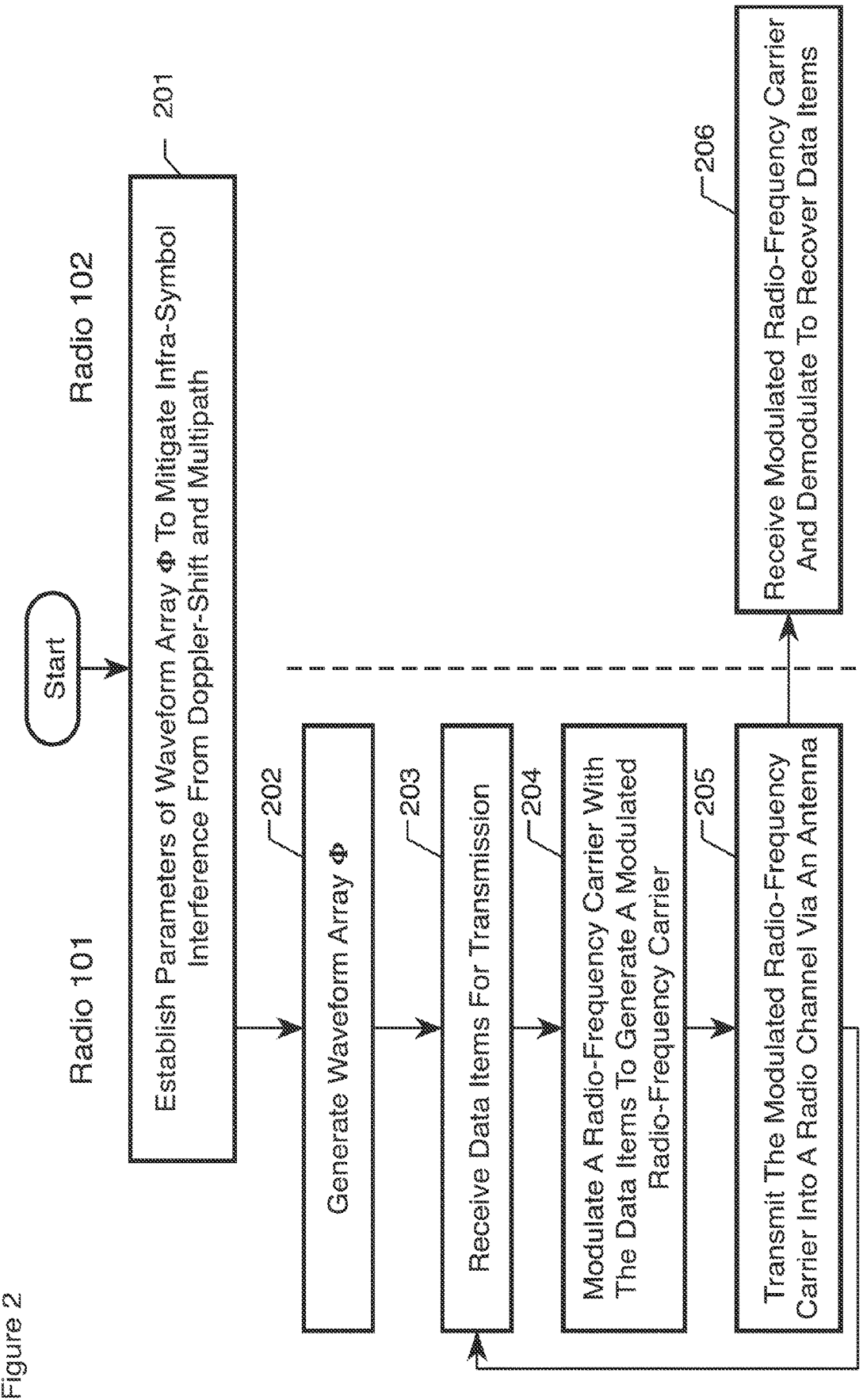
FIG. 2 depicts a flowchart of the salient tasks performed by radio 101 and radio 102 in accordance with the illustrative embodiment of the present invention.

FIG. 2 depicts a flowchart of the salient tasks performed by radios 101 and 102 in accordance with the illustrative embodiment of the present invention.

At task 201, radios 101 and 102 establish the parameters of waveform array $\Phi$ to mitigate infra-symbol interference caused by Doppler-shift and multipath interference. As will be described in detail below, waveform array $\Phi$ comprises waveforms that convey data items from radio 101 to radio 102.

In accordance with the illustrative embodiment, the parameters of waveform array $\Phi$ are established once when radios 101 and 102 first establish communication, but it will be clear to those skilled in the art, after reading this disclosure, how to make and use alternative embodiments of the present invention in which the radios periodically or sporadically re-establish the parameters of waveform array $\Phi$. For example and without limitation, radios 101 and 102 can re-establish the parameters of waveform array $\Phi$ as:

i. traits of the signal path from change, or
   ii. the type of data represented by the data items changes, or
   iii. the latency tolerance of the data items changes, or
   iv. any combination of i, ii, and iii.

In accordance with the illustrative embodiment, radios 101 and 102 convey data items using one waveform array $\Phi$, but it will be clear to those skilled in the art, after reading this disclosure, how to make and use alternative embodiments of the present invention that use any number of waveform arrays (e.g., two waveform arrays $\Phi 1$ and $\Phi 2$; three waveform arrays, $\Phi 1$, $\Phi 2$, and $\Phi 3$; four waveform arrays, $\Phi 1$, $\Phi 2$, $\Phi 3$, and $\Phi 4$; etc.) to convey data items. For example and without limitation, radios 101 and 102 use different waveform arrays for:

i. different conditions of the signal path from radio 101 to radio 102, or
   ii. different types of data items, or
   iii. different latency tolerance of the data items, or
   iv. any combination of i, ii, and iii.

Basic Waveforms—Waveform array $\Phi$ is based on an extension of M basic waveforms $b(1), \ldots, b(m), \ldots, b(M)$ that are orthogonal in M-dimensional vector space, where M is a positive integer greater than 1, and m is a positive integer in the range $m \in \{1, \ldots, M\}$.

Figure 3:
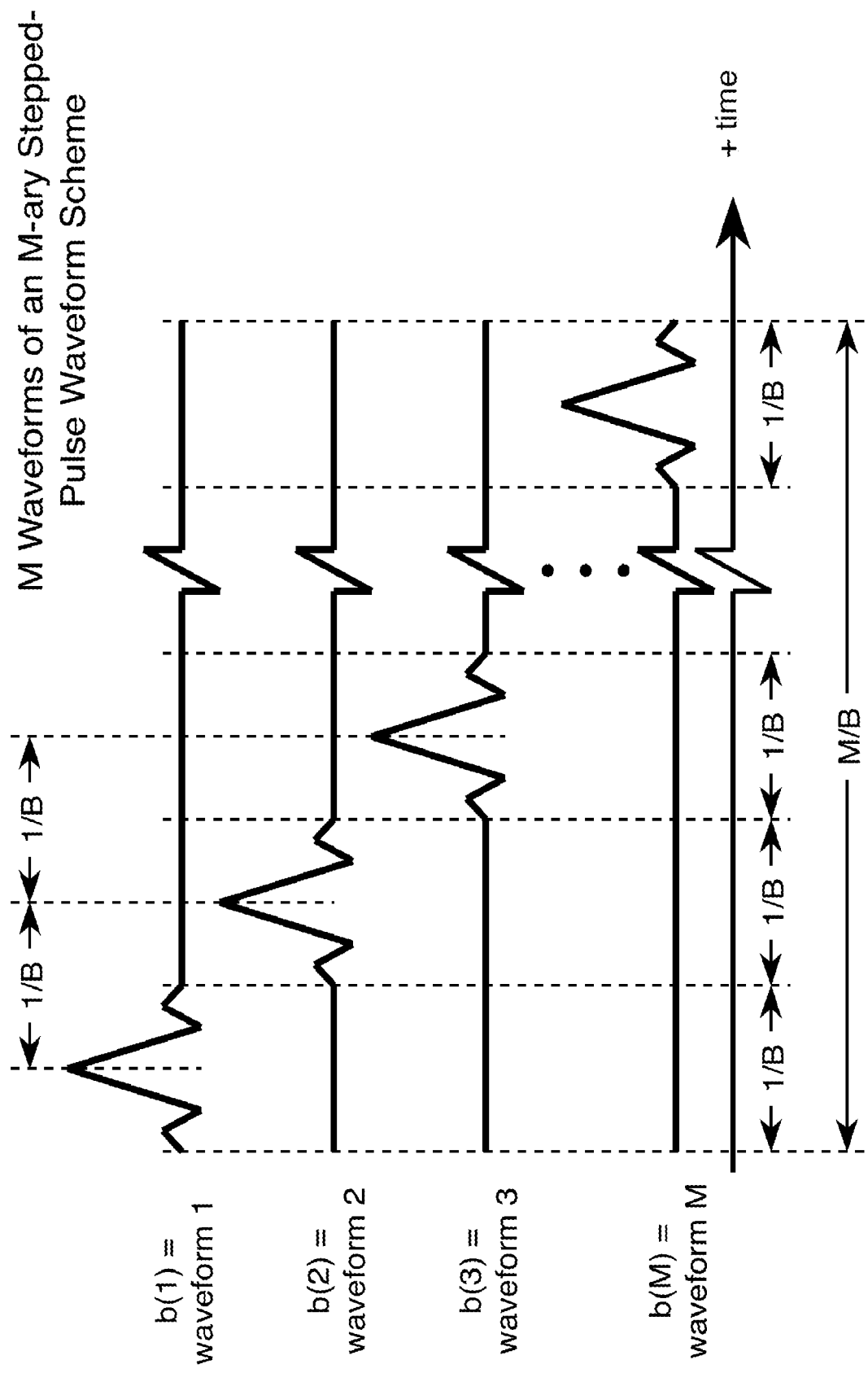
FIG. 3 depicts a waveform array $\Phi$ is based on M orthogonal M-ary stepped-pulse waveforms.

In accordance with the illustrative embodiment, basic waveform $b(m)$ is a waveform m of a M-ary stepped-pulse waveform scheme, as depicted in FIG. 3. In accordance with the illustrative embodiment, each pulse is a band-limited raised-cosine pulse but it will be clear to those skilled in the art, after reading this disclosure, how to make and use alternative embodiments of the present invention in which each pulse has a different shape.

Each pulse in basic waveform $b(m)$ is band-limited, and, therefore, the duration of each pulse is $1/B$ seconds, wherein B is the bandwidth of the channel. Furthermore, the centers of adjacent pulses are separated by $1/B$ seconds. And still furthermore, the total duration of each basic waveform $b(m)$ is $M/B$ seconds (as depicted in FIG. 3).

Although the illustrative embodiment uses stepped-pulse waveforms as the basic waveforms, it will be clear to those skilled in the art, however, after reading this disclosure, how to make and use alternative embodiments of the present invention in which waveform array $\Phi$ is based on any set of M orthogonal waveforms, $b(1), \ldots, b(M)$.

Structure of Waveform Array $\Phi$—Waveform array $\Phi$ comprises $M \cdot N$ waveforms that are orthogonal in $M \cdot N$-dimensional vector space, wherein N is a positive integer greater than 1. The $M \cdot N$ waveforms of waveform array $\Phi$ are $\varphi(1,1), \ldots, \varphi(m,n), \ldots, \varphi(M,N)$, where n is a positive integer in the range $n \in \{1, \ldots, N\}$.

Each waveform $\varphi(m,n)$ is the sum of N waveforms $y(m,n,1), \ldots, y(m,n,p), \ldots, y(m,n,N)$.

Each waveform $\varphi(m,n)$ is identically partitioned into N time slots $1, \ldots, p, \ldots, N$, where p is a positive integer in the range $p \in \{1, \ldots, N\}$. Waveform $y(m,n,p)$ occupies time slot p in waveform $\varphi(m,p)$ and equals:

$$y(m,n,p) = b(m) \cdot u(n,p) \quad \text{(Eq. 1)}$$

wherein $u(n,p)$ is a phasor that equals:

$$u(n,p) = \exp(2\pi(n-1)(p-1)i/N) \quad \text{(Eq. 2)}$$

The duration of waveform $y(m,n,p)$ defines the duration of time slot p.

Figure 4:
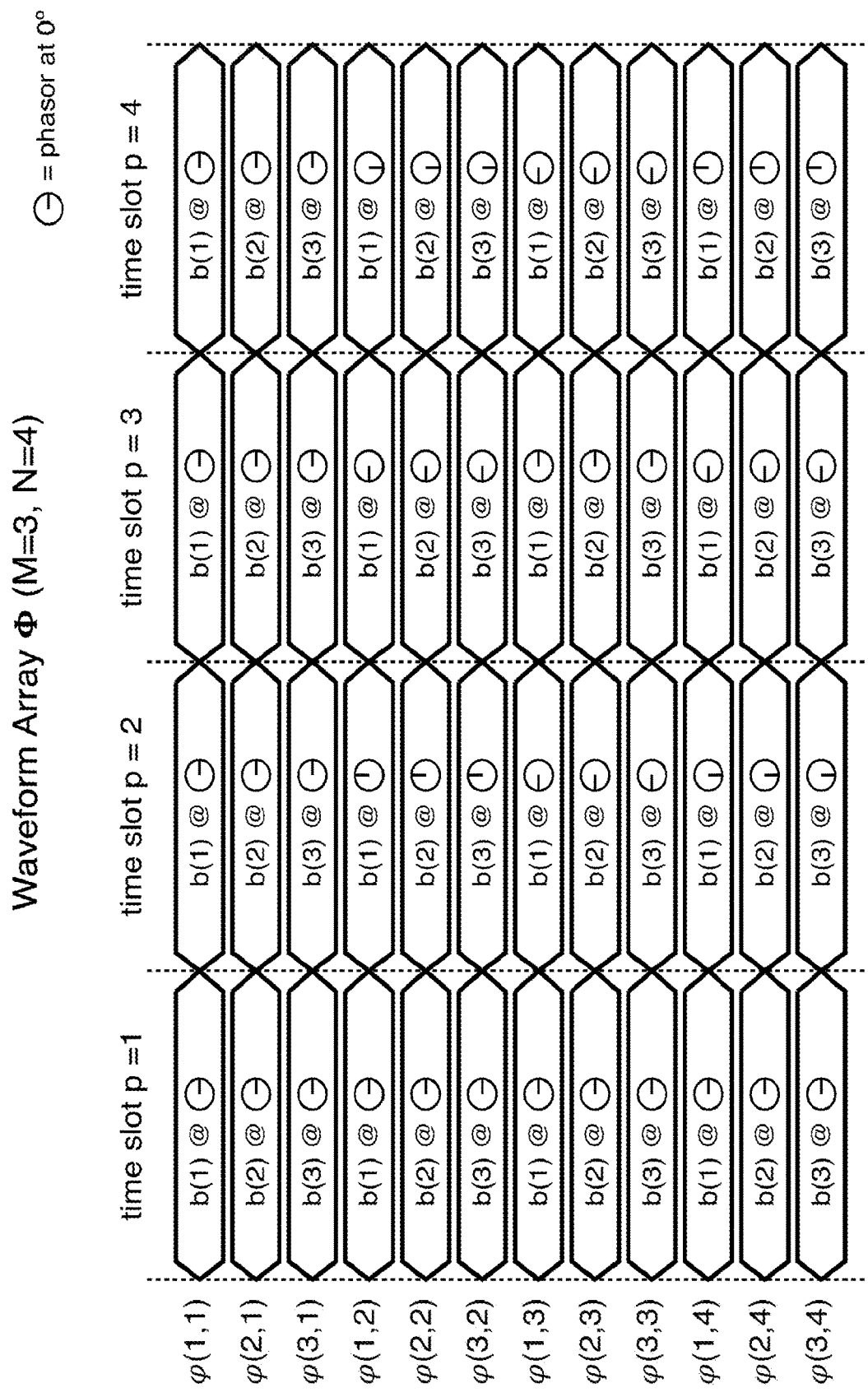
FIG. 4 depicts the composition of waveform array $\Phi$ (M=3 and N=4) for any set of orthogonal basic waveforms.
Figure 5:
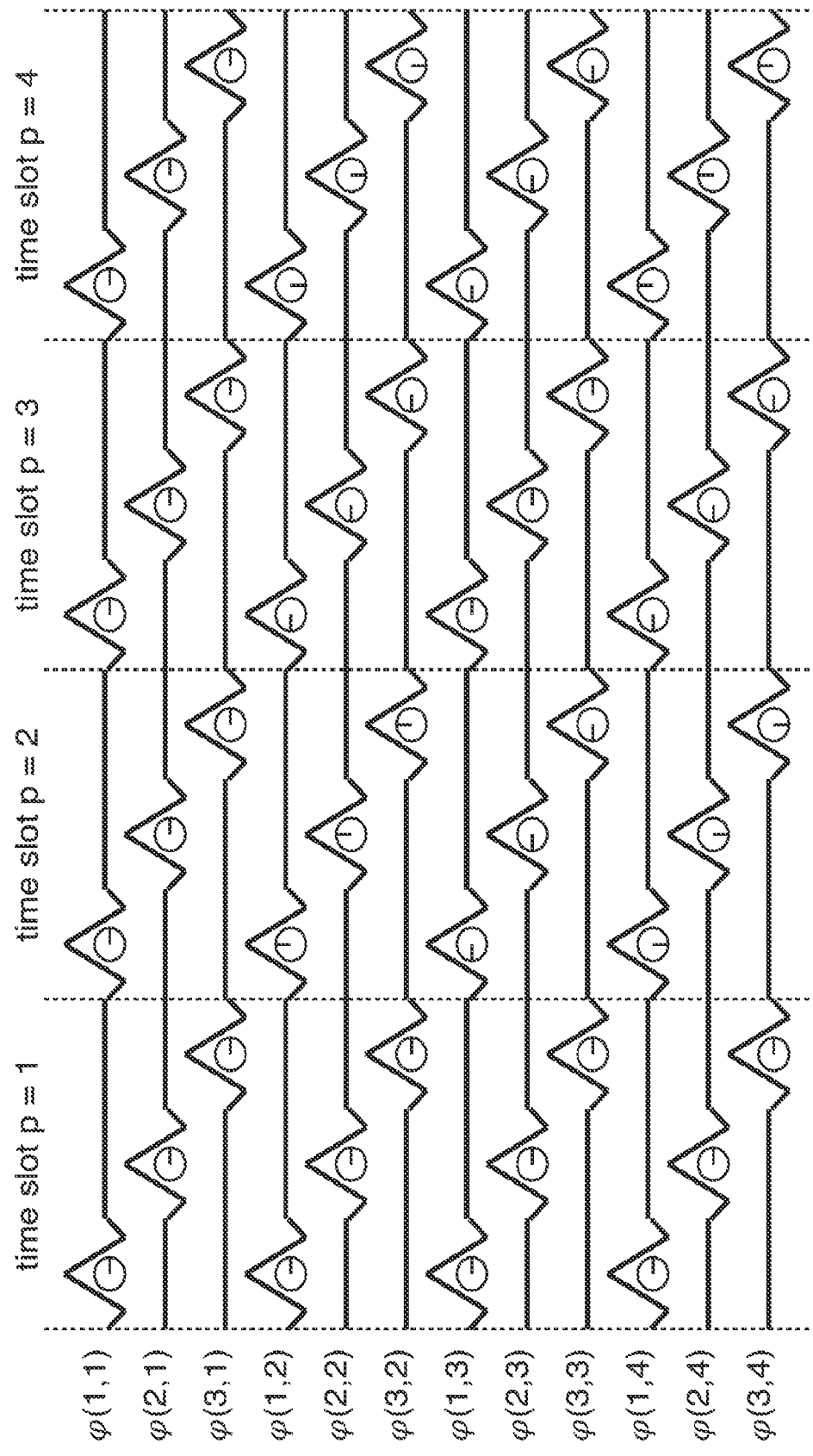
FIG. 5 depicts the composition of waveform array $\Phi$ (M=3 and N=4) for the stepped-pulse waveform.

An illustrative waveform array $\Phi$ (M=3 and N=4) is depicted in FIG. 4 and FIG. 5, and the phasors $u(n,p)$ associated the array are depicted in Table 1.

TABLE 1

Phasors $u(n, p)$ for Each Waveform $y(m, n, p)$ in Waveform Array $\Phi$ (M = 3 and N = 4)

|          | time slot p = 1 | time slot p = 2 | time slot p = 3 | time slot p = 4 |
|----------|-----------------|-----------------|-----------------|-----------------|
| y(m, 1, p) | 1 + 0i | 1 + 0i | 1 + 0i | 1 + 0i |
| y(m, 2, p) | 1 + 0i | 0 + 1i | −1 + 0i | 0 − 1i |
| y(m, 3, p) | 1 + 0i | −1 + 0i | 1 + 0i | −1 + 0i |
| y(m, 4, p) | 1 + 0i | 0 − 1i | −1 + 0i | 0 + 1i |

A salient characteristic of the illustrative embodiment is that each waveform $\varphi(m,n)$ deposits energy into:
  i. unique time-frequency portions the radio channel, and
  ii. $1/M \cdot N^{th}$ of the radio channel.
This is illustrated in FIGS. 6 and 7.

Figure 6:
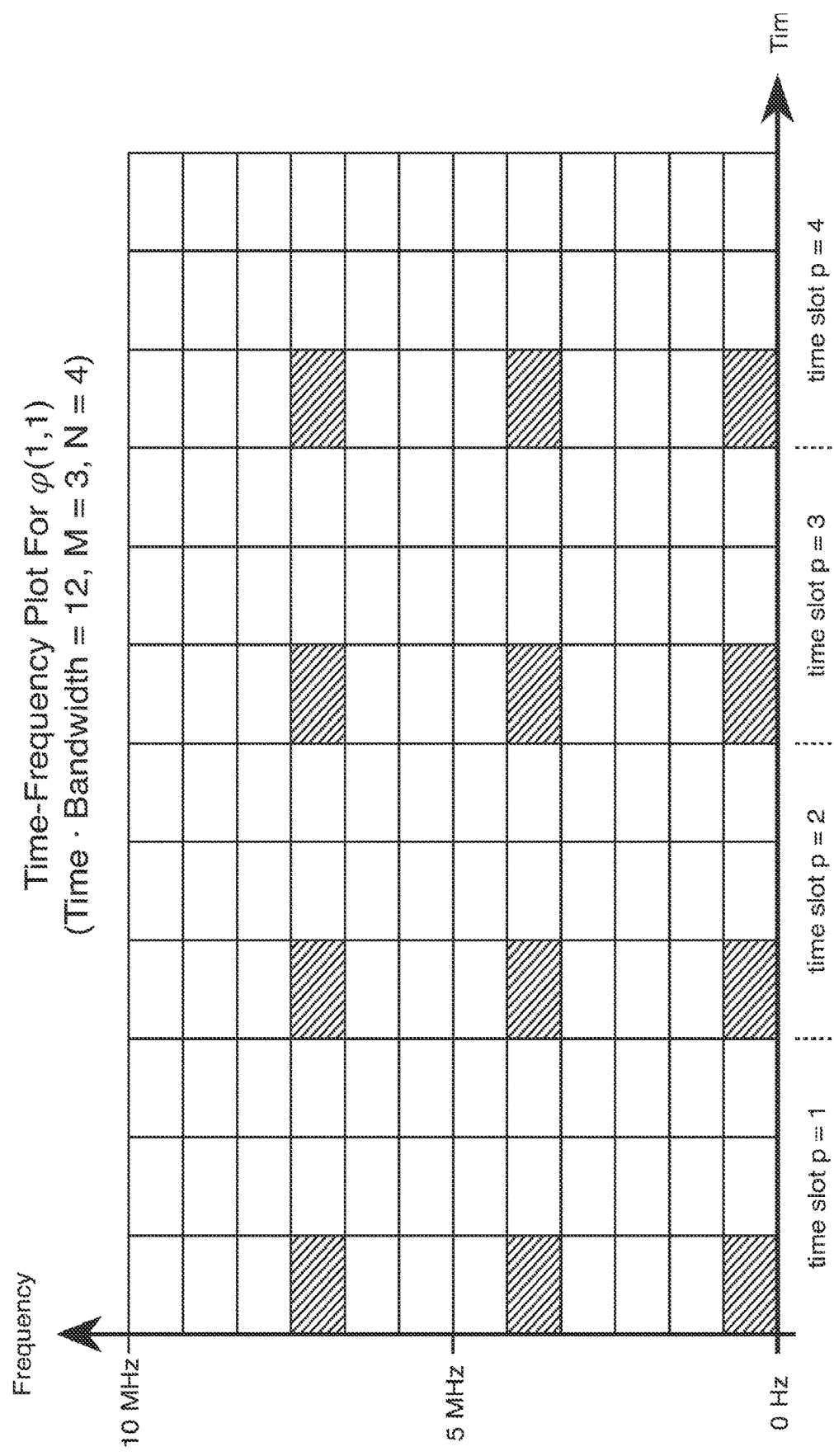
FIG. 6 depicts a time-frequency plot for one of the waveforms—waveform $\varphi(1,1)$—in the illustrative waveform array $\Phi$ (M=3 and N=4).

For example, FIG. 6 depicts a plot of where the energy associated with waveform $\varphi(1,1)$ [in waveform array $\Phi$ (M=3 and N=4)] is deposited into the 10 MHz radio channel. In FIG. 6 the radio channel depicted as divided into twelve 833.3 KHz frequency bands (B=10 MHz/M·N=12) and twelve (M·N=12) intervals. In FIG. 6, it can be seen that energy exists only in those intervals when the raised-cosine pulse exists and only in the frequency sub-bands 0-0.833 MHz, 3.333-4.167 MHz, and 6.667-7.500 MHz (i.e., the diagonally-striped blocks) in the channel.

Figure 7:
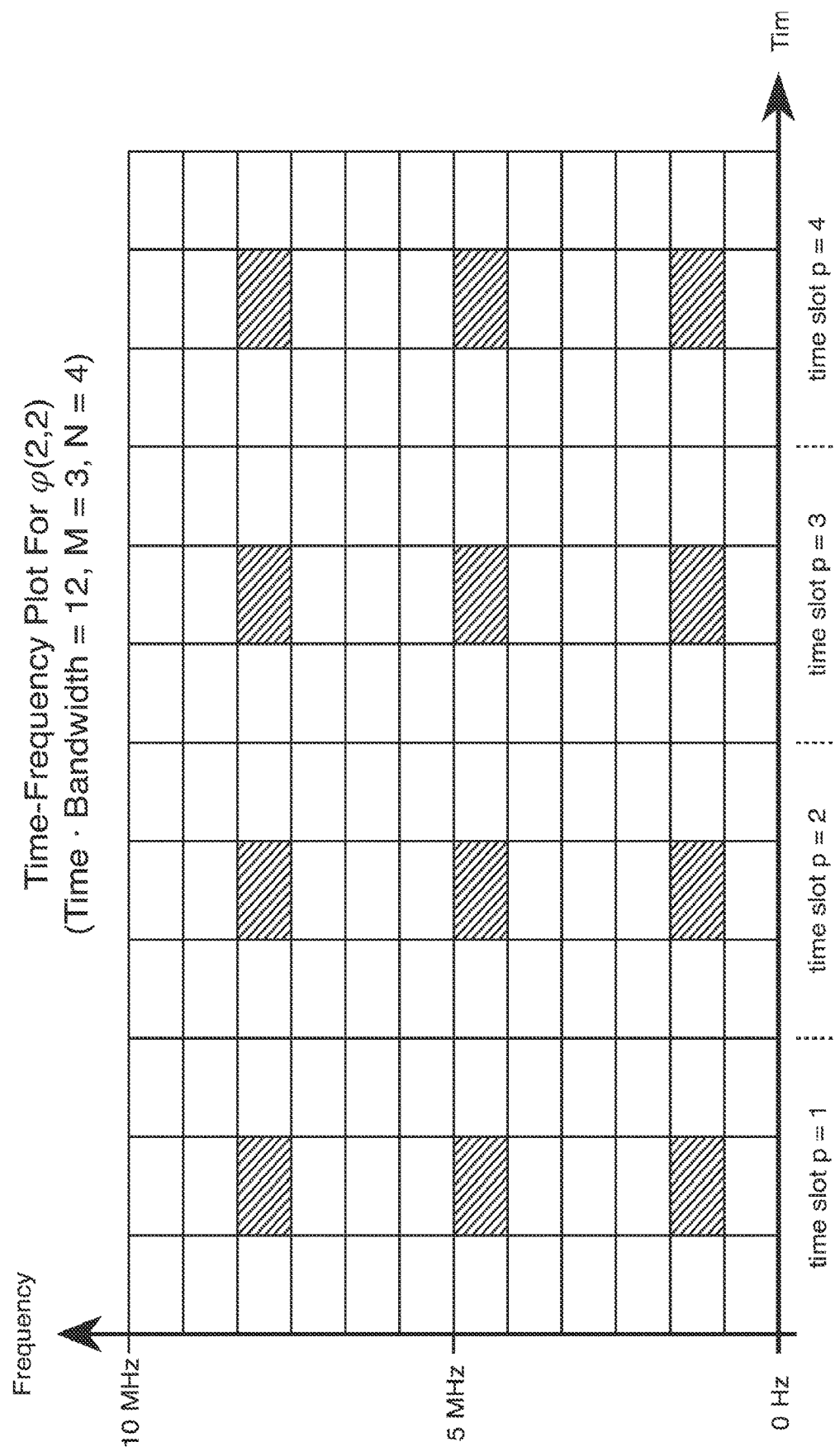
FIG. 7 depicts a time-frequency plot for a different one of the waveforms—waveform $\varphi(2,2)$—in the illustrative waveform array $\Phi$ (M=3 and N=4).

Similarly, FIG. 7 depicts a plot of where the energy associated with waveform $\varphi(2,2)$ [in waveform array $\Phi$ (M=3 and N=4)] is deposited into the 10 MHz radio channel. In FIG. 7, it can be seen that energy exists only in those intervals when the raised-cosine pulse exists and only in the frequency sub-bands 0.833-1.667 MHz, 4.167-5.000 MHz, and 7.500-8.333 MHz (i.e., the diagonally-striped blocks) in the channel. It will be clear to those skilled in the art, after reading this disclosure, how to determine where the energy associated with any waveform $\varphi(m,n)$ is deposited for an M and N.

Figure 8:
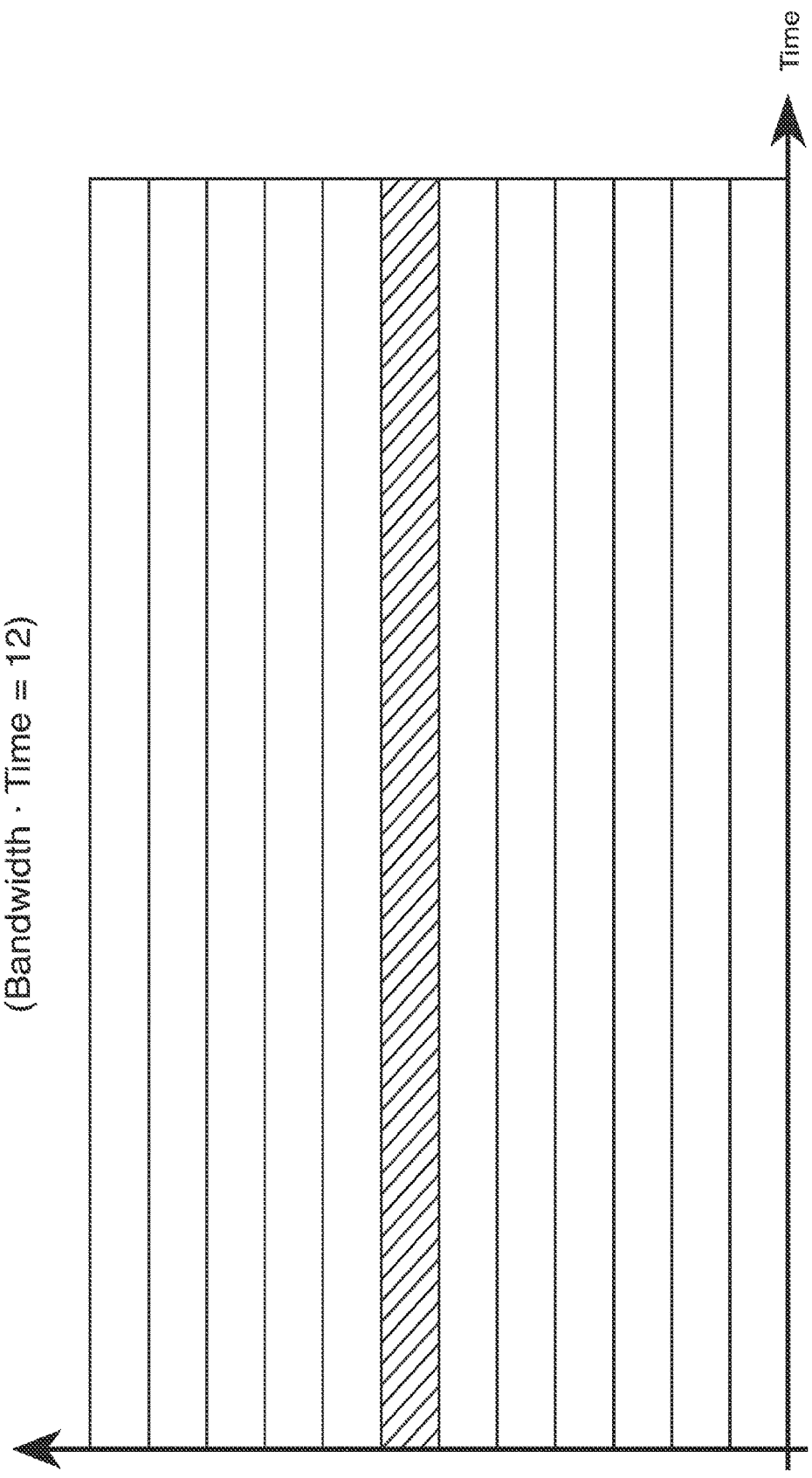
FIG. 8 depicts a time-frequency plot for the transmission of one data item in a frequency-division multiplexed/frequency-division multiple access ("FDM/FDMA") scheme.

For comparison, FIG. 8 depicts an analogous time-frequency plot for the transmission of one data item in a frequency-division multiplexed/frequency-division multiple access ("FDM/FDMA") scheme. In FIG. 8, the striped portion of the time-frequency plot indicates which portion of the channel is occupied by the waveform that transmits the data item.

Figure 9:
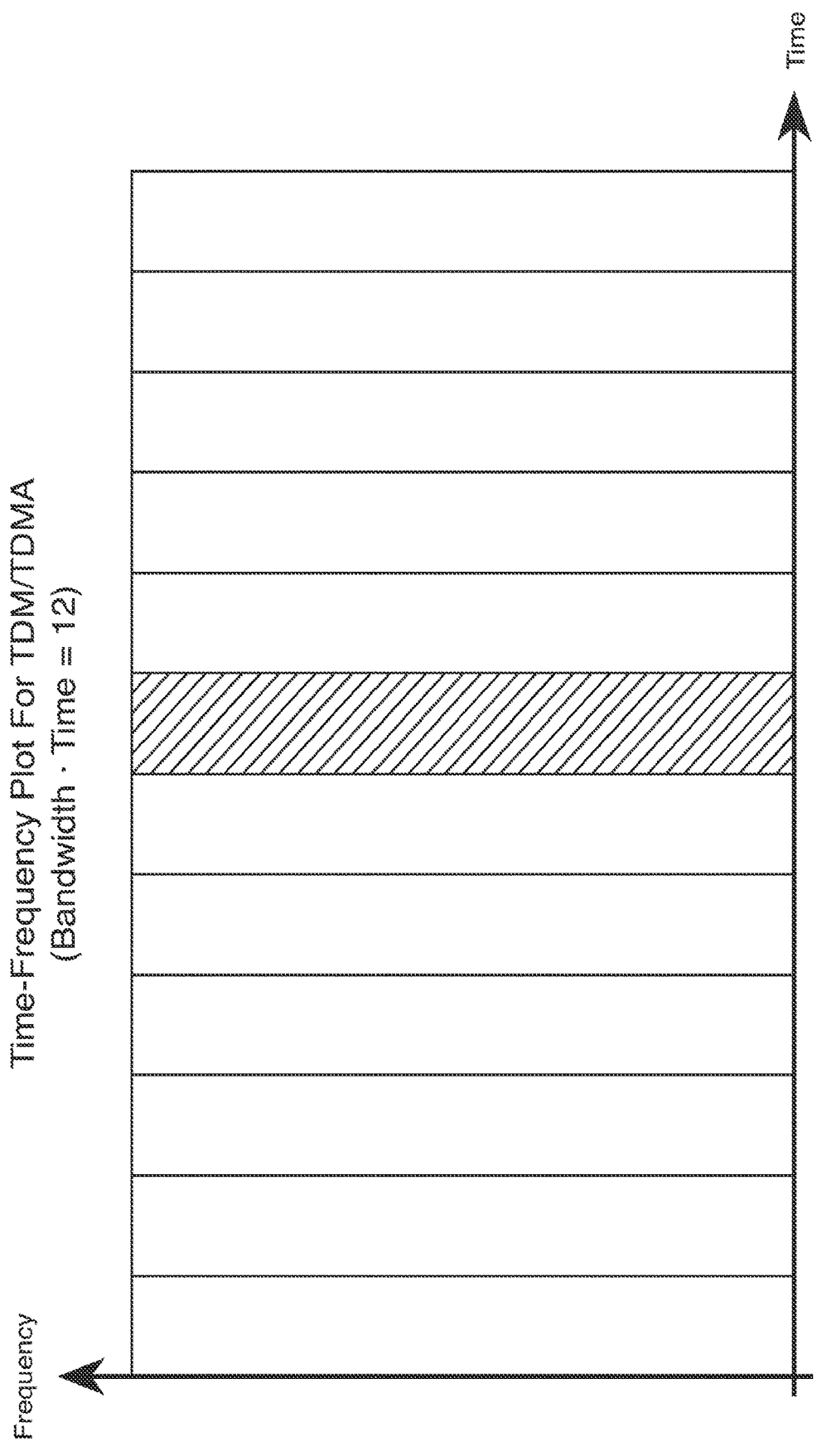
FIG. 9 depicts a time-frequency plot for the transmission of one data item in a time-division multiplexed/time-division multiple access ("TDM/TDMA") scheme.

As another example, FIG. 9 depicts an analogous time-frequency plot for the transmission of one data item in a time-division multiplexed/time-division multiple access ("TDM/TDMA") scheme. In FIG. 9, the striped portion of the time-frequency plot indicates which portion of the channel is occupied by the waveform that transmits the data item.

Figure 10:
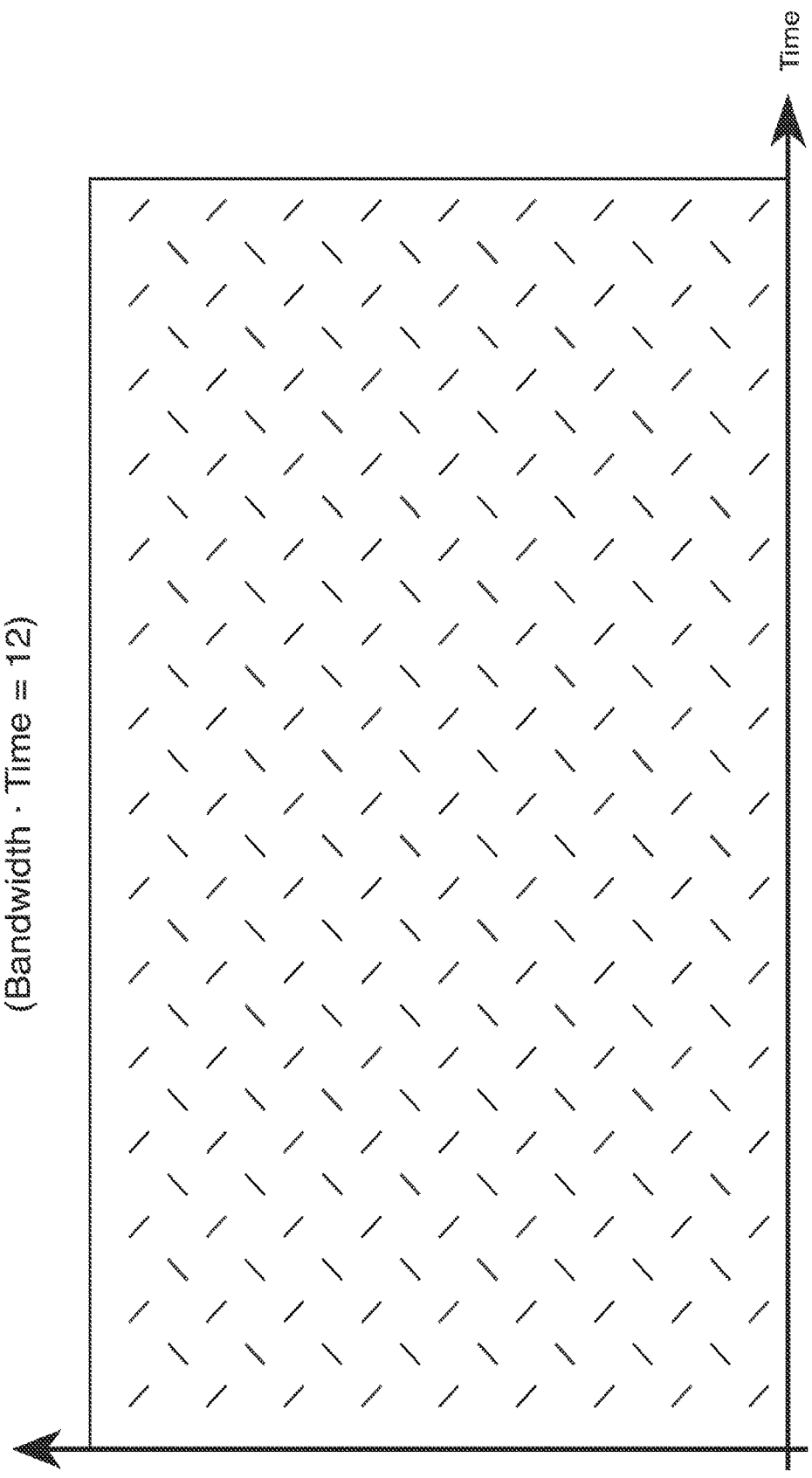
FIG. 10 depicts a time-frequency plot for the transmission of one data item in a code-division multiplexed/code-division multiple access ("CDM/CDMA") scheme.

As another example, FIG. 10 depicts a time-frequency plot for the transmission of one data item in a code-division multiplexed/code-division multiple access ("CDM/CDMA") scheme. In FIG. 10, the entire time-frequency plot is partially striped to indicate that energy is deposited throughout all of the channel all of the time by the waveform that transmits one data item.

Figure 11:
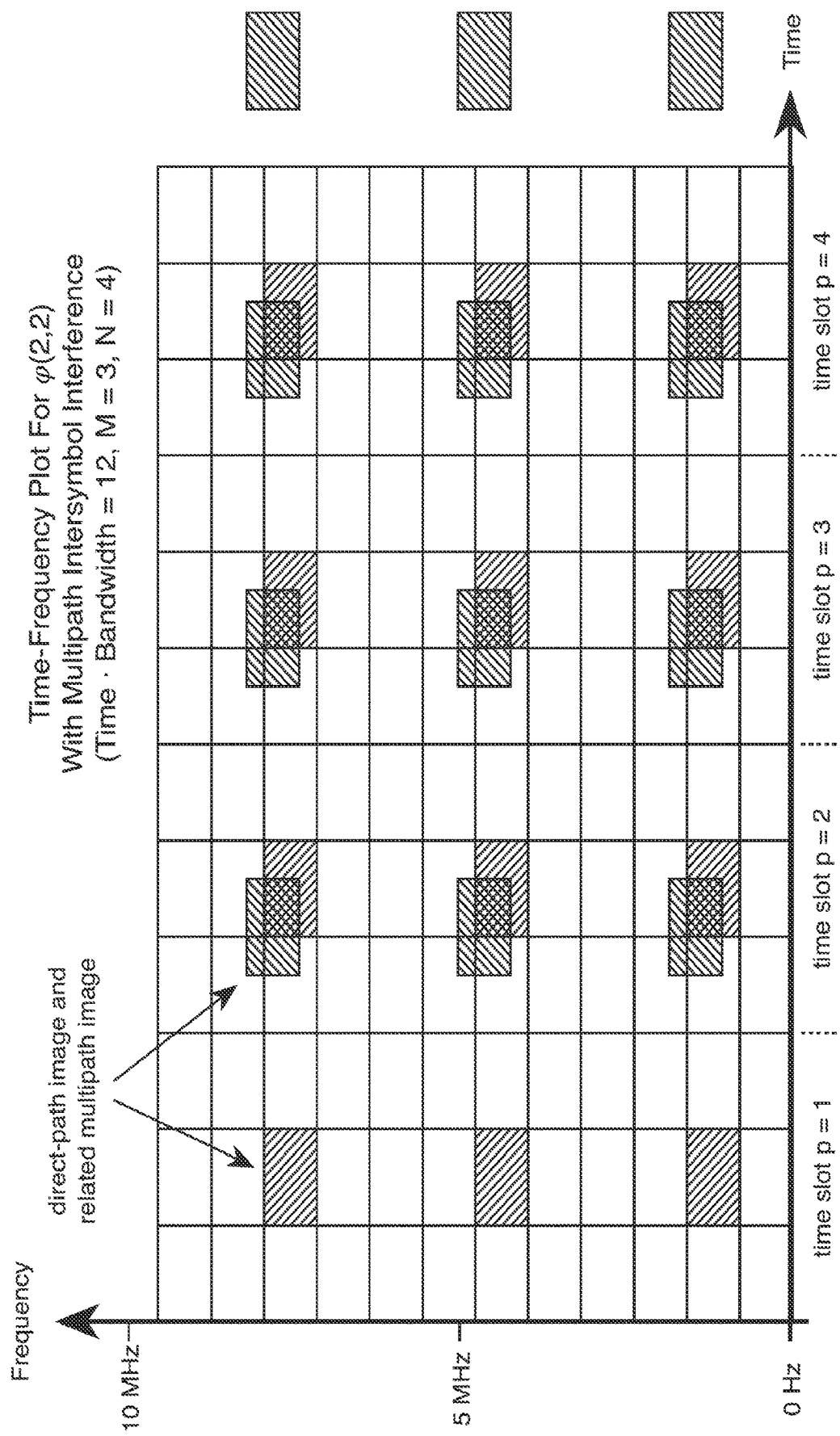
FIG. 11 depicts a time-frequency plot in which a Doppler-shifted multipath image of waveform $\varphi(2,2)$ causes infra-symbol interference.

FIG. 11 depicts a plot of where the energy associated with waveform $\varphi(2,2)$ [in waveform array $\Phi$ (M=3 and N=4)] is received from the 10 MHz radio channel. In particular, FIG. 11 depicts:
  (i) a direct-path image of waveform $\varphi(2,2)$, and
  (ii) a Doppler-shifted multipath image of waveform $\varphi(2,2)$.

From FIG. 11, it can be seen the Doppler-shifted multipath image partially overlaps—and causes infrasymbol interference to—the direct-path image. Furthermore, the Doppler-shifted multipath image partially overlaps—and causes intersymbol interference to the direct-path images of waveforms $\varphi(1,2)$, $\varphi(1,3)$, and $\varphi(3,2)$. When the receiver can discriminate between the direct-path and multipath images, the infrasymbol interference can be avoided and the intersymbol interference can be eliminated.

Figure 12:
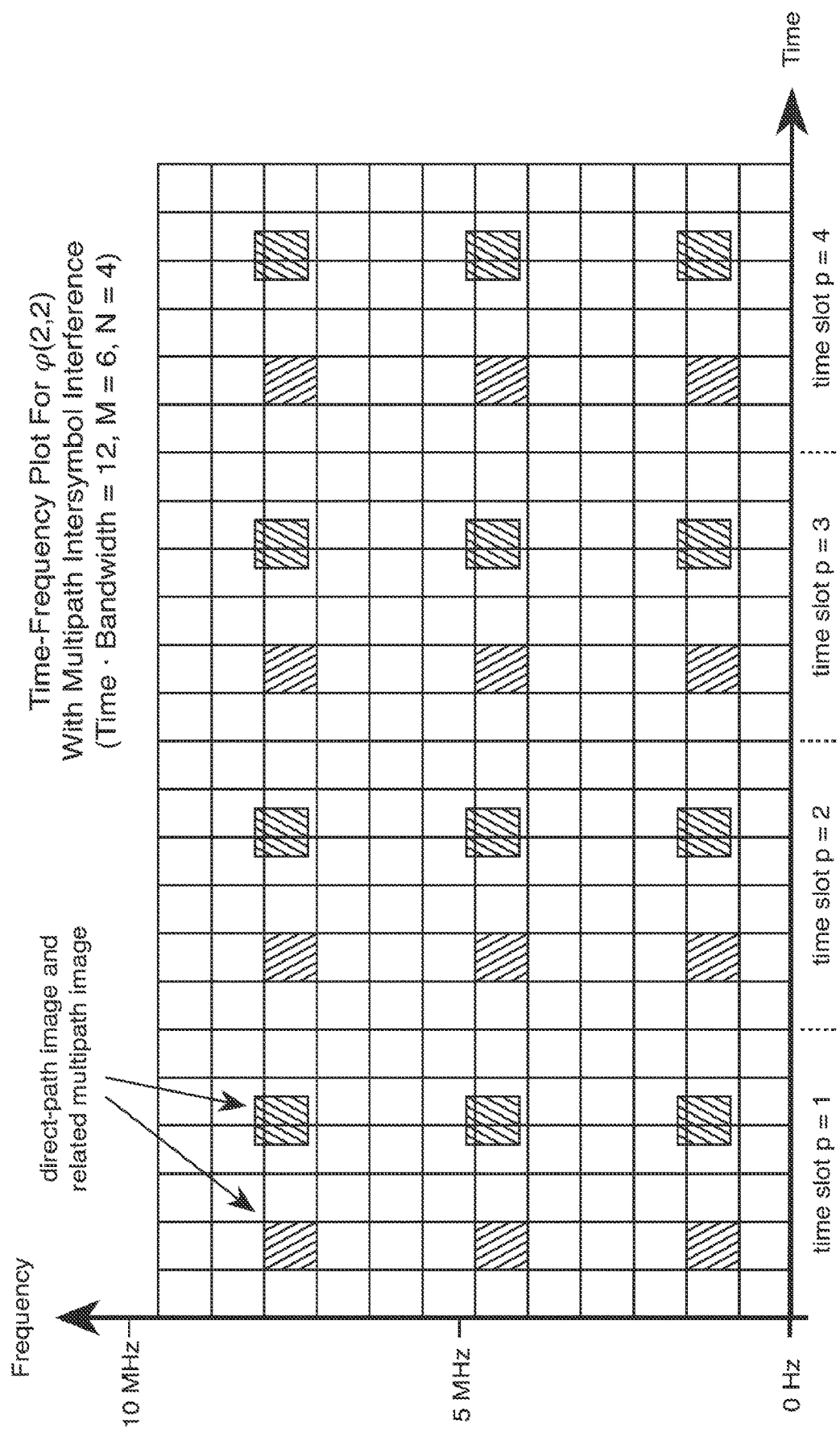
FIG. 12 depicts a time-frequency plot in which a Doppler-shifted multipath image of waveform $\varphi(2,2)$ does not cause infra-symbol interference given the same delay spread as in FIG. 11.

In particular, the ability of embodiments of the present invention to discriminate between direct-path and multipath images of waveform $\varphi(m,n)$ is a function of the values of M and N. In general, larger values of M and N enable higher resolution, and, therefore, greater discrimination between direct-path and multipath images. In particular, larger values of M enable greater discrimination in frequency (i.e., between Doppler-shifted images) and larger values of N enable greater discrimination in time (i.e., between delayed images). As a general rule of thumb, values of M should be much larger than the largest expected delay spread in the radio channel and values of N should be larger than the largest expected Doppler-shift in the radio channel. It will be clear to those skilled in the art, after reading this disclosure, how to make and use alternative embodiments of the present invention with any value of M, any value of N, and a set of M basic waveforms $b(1), \ldots, b(M)$. FIG. 12 depicts a time-frequency plot in which a Doppler-shifted multipath image of waveform $\varphi(2,2)$ does not cause infra-symbol interference given the same delay spread as in FIG. 11.

At task 202, radio 101 generates the complete set of M·N waveforms of waveform array $\Phi$, $\varphi(1,1), \ldots, \varphi(m,n), \ldots, \varphi(M,N)$, in accordance with the parameters established in task 201.

At task 203, radio 101 receives up to M·N data items for transmission to radio 102. As part of task 203, radio 101 establishes a one-to-one relationship between each data item and each waveform $\varphi(m,n)$ in waveform array $\Phi$. In particular, the data item that corresponds to waveform $\phi(m,n)$ is designated $d(m,n)$. It will be clear to those skilled in the art, after reading this disclosure, how to make and use embodiments of the present invention that perform task 203.

At task 204, radio 101 modulates a radio-frequency carrier signal with the data items to generate a modulated radio-frequency carrier signal. In particular, the radio-frequency carrier signal is modulated by:

$$\Sigma \varphi(m,n) \cdot d(m,n)$$

for all of the data items that were received in task 203. It will be clear to those skilled in the art, after reading this disclosure, how to make and use embodiments of the present invention that perform task 204.

At task 205, the modulated radio-frequency carrier signal is transmitted/radiated into the radio channel via an antenna for reception by radio 102.

At task 206, radio 102 receives the modulated radio-frequency carrier signal and demodulates it using M·N matched filters, in well-known fashion, to recover the each of the data items that were transmitted by radio 101.

Markman Definitions

Orthogonal—For the purpose of this specification, two waveforms are orthogonal if their inner product is zero over the time interval of interest.

What is claimed is:

1. An apparatus for wireless communication, comprising:
a modulator configured to:
  receive a data item d(1,1) and a data item d(1,2),
  generate a waveform φ(1,1) and a waveform φ(1,2) wherein:
    (i) the waveform φ(m,n) is partitioned into N time slots 1, . . . , p, . . . , N,
    (ii) time slot p of the waveform φ(m,n) comprises a basic waveform b(m) multiplied by exp[2π(n−1)(p−1)i/N],
    (iii) the waveform φ(m,n) is multiplied by the data item d(m,n),
    (iv) M and N are positive integers greater than 1,
    (v) m is a positive integer in a range m∈{1, . . . , M}, and
    (vi) n and p are positive integers in a range n∈{1, . . . , N}, and
  modulate a radio-frequency carrier signal with a sum of the waveform φ(1,1) and the waveform φ(1,2) to generate a modulated radio-frequency carrier signal; and
an antenna configured to radiate the modulated radio-frequency carrier signal into a radio channel.

2. The apparatus of claim 1, wherein j and k are positive integers in the range m∈{1, . . . , M}, and wherein a basic waveform b(j) and a basic waveform b(k) are orthogonal for j≠k.

3. The apparatus of claim 1, wherein the basic waveform b(m) is waveform m in an M-ary stepped-pulse waveform scheme.

4. The apparatus of claim 1, wherein a bandwidth of the radio channel is B Hz, and a duration of the basic waveform b(m) is M/B seconds.

5. The apparatus of claim 1, wherein a bandwidth of the radio channel is B Hz, and a duration of the waveform φ(m,n) is M·N/B seconds.

6. An apparatus for wireless communication, comprising:
a modulator configured to:
  receive a data item d(1,1) and a data item d(2,1),
  generate a waveform φ(1,1) and a waveform φ(2,1) wherein:
    (i) the waveform φ(m,n) is partitioned into N time slots 1, . . . p, N,
    (ii) time slot p of the waveform φ(m,n) comprises a basic waveform b(m) multiplied by exp[2π(n−1)(p−1)i/N],
    (iii) the waveform φ(m,n) is multiplied by the data item d(m,n),
    (iv) M and N are positive integers greater than 1,
    (v) m is a positive integer in a range m∈{1, . . . , M}, and
    (vi) n and p are positive integers in a range n∈{1, . . . , N}, and
  modulate a radio-frequency carrier signal with a sum of the waveform φ(1,1) and the waveform φ(2,1) to generate a modulated radio-frequency carrier signal; and
an antenna configured to radiate the modulated radio-frequency carrier signal into a radio channel.

7. The apparatus of claim 6, wherein j and k are positive integers in the range m∈{1, . . . , M}, and wherein a basic waveform b(j) and a basic waveform b(k) are orthogonal for j≠k.

8. The apparatus of claim 6, wherein the basic waveform b(m) is waveform m in an M-ary stepped-pulse waveform scheme.

9. The apparatus of claim 6, wherein a bandwidth of the radio channel is B Hz, and a duration of the basic waveform b(m) is M/B seconds.

10. The apparatus of claim 6, wherein a bandwidth of the radio channel is B Hz, and a duration of the waveform φ(m,n) is M·N/B seconds.

11. An apparatus for wireless communication, comprising:
a modulator configured to:
  receive a data item d(1,1) and a data item d(2,2);
  generate a waveform φ(1,1) and a waveform φ(2,2) wherein:
    (i) the waveform φ(m,n) is partitioned into N time slots 1, . . . p, N,
    (ii) time slot p of the waveform φ(m,n) comprises a basic waveform b(m) multiplied by exp[2π(n−1)(p−1)i/N],
    (iii) the waveform φ(m,n) is multiplied by the data item d(m,n),
    (iv) M and N are positive integers greater than 1,
    (v) m is a positive integer in a range m∈{1, . . . , M}, and
    (vi) n and p are positive integers in a range n∈{1, . . . , N}, and
  modulate a radio-frequency carrier signal with a sum of the waveform φ(1,1) and the waveform φ(2,2) to generate a modulated radio-frequency carrier signal; and
an antenna configured to radiate the modulated radio-frequency carrier signal into a radio channel.

12. The apparatus of claim 11, wherein j and k are positive integers in the range m∈{1, . . . , M }, and wherein a basic waveform b(j) and a basic waveform b(k) are orthogonal for j ≠k.

13. The apparatus of claim 11, wherein the basic waveform b(m) is waveform m in an M-ary stepped-pulse waveform scheme.

14. The apparatus of claim 11, wherein a bandwidth of the radio channel is B Hz, and a duration of the basic waveform b(m) is M/B seconds.

15. The apparatus of claim 11, wherein a bandwidth of the radio channel is B Hz, and a duration of the waveform φ(m,n) is M·N/B seconds.

16. An apparatus for wireless communication, comprising:
a modulator configured to:
  receive M·N data items d(1,1), . . . , d(m,n), . . . , d(M,N);
  generate M·N waveforms φ(1,1), . . . , φ(m, n), . . . , φ(M,N), wherein
    (i) the waveform φ(m,n) is partitioned into N time slots 1, . . . , p, . . . , N, (ii) time slot p of the waveform $\varphi(m,n)$ comprises a basic waveform $b(m)$ multiplied by $\exp[2\pi:(n-1)(p-1)i/N]$, (iii) the waveform $\varphi(m,n)$ is multiplied by the data item $d(m,n)$, (iv) M and N are positive integers greater than 1, (v) m is a positive integer in a range $m\epsilon\{1, \ldots, M\}$, and (vi) n and p are positive integers in a range $n\epsilon\{1, \ldots, N\}$, and modulate a radio-frequency carrier signal with a sum of $M\cdot N$ waveforms $\varphi(1,1), \ldots, \varphi(m,n), \ldots, \varphi(M,N)$, to generate a modulated radio-frequency carrier signal; and an antenna configured to transmit the modulated radio-frequency carrier signal into a radio channel.

17. The apparatus of claim 16, wherein j and k are positive integers in the range $m\epsilon\{1, \ldots, M\}$, and wherein a basic waveform $b(j)$ and a basic waveform $b(k)$ are orthogonal for $j \neq k$.

18. The apparatus of claim 16, wherein the basic waveform $b(m)$ is waveform m in an M-ary stepped-pulse waveform scheme.

19. The apparatus of claim 16, wherein a bandwidth of the radio channel is B Hz, and a duration of the basic waveform $b(m)$ is M/B seconds.

20. The apparatus of claim 16, wherein a bandwidth of the radio channel is B Hz, and a duration of the waveform $\varphi(m,n)$ is M·N/B seconds.

\* \* \* \* \*

UNITED STATES PATENT AND TRADEMARK OFFICE
CERTIFICATE OF CORRECTION

PATENT NO. : 10,555,281 B2
APPLICATION NO. : 16/084820
DATED : February 4, 2020
INVENTOR(S) : Ron Hadani and Shlomo Rakib It is certified that error appears in the above-identified patent and that said Letters Patent is hereby corrected as shown below:

In the Specification

Column 1, Line 20, delete "by the" and insert -- by --

In the Claims

Column 8, Lines 31-32, in Claim 11, delete "exp[2π(n-1) (p-1}i/N]," and insert
-- exp[2π(n-1) (p-1) i/N], --
Column 9, Lines 2-3, in Claim 16, delete "exp[2π:(n-1) (p-1)i/N]," and insert
-- exp[2π(n-1) (p-1) i/N], --

Signed and Sealed this
Second Day of February, 2021

Drew Hirshfeld
*Performing the Functions and Duties of the
Under Secretary of Commerce for Intellectual Property and
Director of the United States Patent and Trademark Office*